United States Patent Office 3,425,999
Patented Feb. 4, 1969

3,425,999
TETRAHYDROFURAN-ETHYLENE OXIDE POLY-ETHER URETHANE-UREA POLYMERS
Seymour L. Axelrood, Trenton, and Wayne G. Lajiness, Wyandotte, Mich., assignors to Wyandotte Chemicals Corporation, Wyandotte, Mich., a corporation of Michigan
No Drawing. Filed July 11, 1966, Ser. No. 563,992
U.S. Cl. 260—77.5     14 Claims
Int. Cl. C08g 22/14

ABSTRACT OF THE DISCLOSURE

A polyether urethane-urea polymer is prepared from the reaction product of a heteric polyether polyol and an organic polyisocyanate with a polyamine. The heteric polyether polyol is obtained by the reaction of a mixture of ethylene oxide and tetrahydrofuran with a hydroxyl containing compound having functionality of at least two.

---

This invention relates to a new class of polyether urethane-urea compositions. In a more specific aspect, this invention relates to a new class of tetrahydrofuran-ethylene oxide polyether urethane-urea elastomers.

There is a domestic and military need for materials that are chemical and oil resistant and yet possess elastomeric properties over a broad range of climatic conditions. These climatic conditions range from those encountered in the tropics to the arctic regions. Many commercial elastomers possess properties which make them serviceable under the normal or more prevalent conditions. However, they do not possess the combined properties of low temperature flexibility and oil resistance.

Accordingly, an object of the present invention is to provide a new class of polyether urethane-urea compositions of different structure and, therefore, having different properties to the compounds heretofore known.

A specific object of this invention is to provide a new class of polyether urethane-urea elastomers which possess oil absorption resistance in addition to low temperature flexibility.

Another object of this invention is to provide a new class of polyether urethane-urea elastomers having low water absorption.

A further object of this invention is to provide a new class of polyether urethane-urea elastomers possessing improved tensile strength, elongation, compression set and elasticity.

A still further object of this invention is to provide a new class of polyether urethane-urea elastomers having the above properties in combination and which are stable in the uncured and cured state for extended periods of from about one to two years.

Urethane elastomers, as such, are well known in the art. They are generally prepared by the catalyzed reaction of an organic diisocyanate with a hydroxyl-containing compound and a diamine chain-extending agent.

Now, in accordance with this invention, a polyether urethane-urea polymer has been found which may be satisfactorily employed in urethane elastomer production. Specifically, the polyether urethane-urea polymer of this invention comprises the reaction product of:

(a) a copolymer of tetrahydrofuran and ethylene oxide having an ethylene oxide content of from about 20% to 60% by weight of said copolymer and a molecular weight of from about 400 to 16,000,
(b) an organic polyisocyanate, and
(c) a polyamine selected from the group consisting of primary and secondary polyamines and mixtures thereof, the polymer having an amine to hydroxyl ratio of from about 0.25/1 to 6.0/1 and an isocyanate (—NCO) to amine plus (+) hydroxyl ratio of from about 0.9/1 to 1.5/1.

The tetrahydrofuran-ethylene oxide polyether urethane-urea elastomers of this invention possess an unexpected and excellent combination of properties which includes low oil absorption and low temperature flexibility. The products of this invention also meet the tensile strength, elongation and compression set objectives outlined above. These and the other advantageous properties of the urethane elastomers of this invention are outlined in Tables II and III given below.

The hydroxyl-containing compound, which is reacted with the polyisocyanate and polyamine to produce the polyether urethane-urea elastomer, is a polyether polyol. Specifically, the polyether polyol is a copolymer of tetrahydrofuran and ethylene oxide. The tetrahydrofuran-ethylene oxide copolymer is conveniently prepared by the catalytic polymerization of selected amounts of ethylene oxide and tetrahydrofuran monomers with a hydroxyl-containing compound having a functionality of at least two. The polyether polyol may be a diol, triol, tetrol, pentol, hexol, or higher polyol, depending upon the functionality of the hydroxyl-containing compound which is initially used in the reaction with the ethylene oxide and tetrahydrofuran monomers. Using techniques well known in the art, a block, capped, partial heteric, complete heteric, random, and the like, polyether chain structure can be obtained. The polymerization reaction proceeds readily in the presence of a catalyst, such as boron trifluoride etherate, at a temperature in the range of from about 0° to 50° C. and at normal or elevated pressure. The low temperature flexibility of the urethane-urea elastomers of this invention has been determined to be enhanced by the use of high molecular weight polyethers. This determination is the result of a discovery that the concentration of the polar urethane and urea linkages, and the cross-links is a key factor in attaining low temperature flexibility of the elastomeric products. Thus, the tetrahydrofuran-ethylene oxide polyether copolymers of this invention have a molecular weight in the range of from about 400 to about 16,000. A copolymer having a molecular weight of from about 2500 to about 7000 is preferred.

The molecular weight of the tetrahydrofuran-ethylene oxide polyether polyol is calculated from its hydroxyl number according to the formula:

Molecular weight =

$$\frac{56.1 \times 1000 \times \text{number of hydroxyl groups}}{\text{hydroxyl number}}$$

The hydroxyl number of the polyol is calculated as described by ASTM D-1638.

Resistance to oil absorption is a much sought after property for an elastomer. It is desirable to have an elastomer which has an oil absorption of less than about 15 weight percent by weight of elastomer when the elastomer is heated with ASTM No. 3 oil at a temperature of 212° F. for a period of 70 hours. It was surprisingly discovered that an elastomer having such oil absorption values could be obtained by the use of a a tetrahydrofuran-ethylene oxide polyether copolymer in the urethane elastomer preparation.

The amount of ethylene oxide contained in the copolymer is critical in obtaining an elastomer having a high resistance to oil absorption and a low water absorption. If the amount of ethylene oxide is below a certain percentage the resistance of the elastomer to oil is also low. However, if the amount of ethylene oxide is above a certain percentage, the elastomer becomes highly water absorptive without any substantial increase in oil resistance. It is only by using a copolymer containing a controlled amount of ethylene oxide that an oil-resistant elastomer having a low water absorption can be obtained. The tetrahydrofuran-ethylene oxide copolymer useful in the preparation of the polyether urethane-urea elastomer of this invention has an ethylene oxide content in the range of from about 20% to 60% by weight of the copolymer. An ethylene oxide content of from about 30% to 50% by weight of the copolymer is preferred. Table V, presented below, demonstrates the effect which the ethylene oxide content of the copolymer has on the oil absorption and water absorption properties of the polyether urethane-urea elastomers of this invention.

The tetrahydrofuran-ethylene oxide polyether polyols may be employed as the sole hydroxyl-containing component of the urethane elastomers of this invention or they may be employed in combination with other hydroxyl-containing components. If a combination of components is used, at least 35 weight percent by weight of the combination should be the tetrahydrofuran-ethylene oxide component. Other hydroxyl-containing components which may be employed in combination with the tetrahydrofuran-ethylene oxide component include polyhydric alcohols such as glycerol, trimethylolpropane, pentaerythritol, sorbitol and sucrose; polyethers such as polyethylene ether glycols, polypropylene ether glycols, polytetramethylene ether glycols, and alkylene oxide adducts of polyhydric alcohols including those listed above; hydroxy-terminated tertiary amines of the formula:

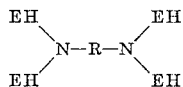

wherein R is an alkylene radical containing at least two to six carbon atoms and E is a polyoxyalkylene chain; amine-based polyethers of the formula:

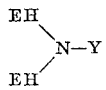

wherein E is a polyoxyalkylene chain and Y is selected from the group consisting of alkyl, hydroxyalkyl, and EH; alkylene oxide adducts of acids of phosphorus such as adducts prepared by the reaction of phosphoric acid and ethylene oxide, phosphoric acid and propylene oxide, phosphorous acid and propylene oxide, phosphonic acid and propylene oxide, phosphinic acid and butylene oxide, polyphhosphoric acid and propylene oxide, and phosphonic acid and styrene oxide; and polyesters such as the reaction products of a polyhydric acid including those listed above and a dibasic carboxylic acid such as succinic acid, maleic acid, adipic acid, phthalic acid and terephthalic acid.

The polyamine component which is used in the preparation of the new urethane-urea elastomers of this invention is a chain-extending agent containing a plurality of active hydrogen atoms capable of reacting with isocyanates. The term "active hydrogen atoms" refers to hydrogens which, because of their position in the molecule, display activity according to the Zerewittinoff test as described by Kohler in J. Am. Chem. Soc., 49, 3181 (1927). The chain extenders most useful in this invention are diamines selected from the group consisting of primary and secondary diamines and mixtures thereof. Typical of the many diamines which may be used in this invention are dichlorobenzidine, 4,4'-methylene-bis(2-chloroaniline), 2-methylpiperazine, piperazine, oxydianiline, p,p'-methylene dianiline, hexamethylene diamine, and dianisidine. The preferred diamines are hindered diamines, such as dichlorobenzidine and methylene bis(2-chloroaniline).

The amount of polyamine chain-extending agent which may be utilized in the preparation of the urethane-urea elastomers of this invention may vary considerably. As noted above, a low concentration of polar urethane and urea linkages and crosslinks is a key factor in attaining low temperature flexibility. This concentration is controlled by the use of higher molecular weight polyols and by reducing the relative concentration of polyamine, i.e., by controlling the amine/hydroxyl ratio. If the amine/hydroxyl ratio is too low, there is a decrease in tensile strength, elongation, modulus and tear strength properties of the elastomers. If this ratio is too high, there is a decrease in the low temperature properties of the elastomer. The compositions of this invention therefore utilize an amine to hydroxyl ratio of from about 0.25/1 to 6.0/1. An amine to hydroxyl ratio of from 0.5/1 to 2.0/1 is preferred.

As representative of the typical organic polyisocyanates which may be used in preparing the elastomers of the present invention, there may be mentioned phenylene diisocyanate, 2,4-tolylene diisocyanate, hexamethylene-1,6-diisocyanate, tetramethylene-1,4-diisocyanate, cyclohexane-1,4-diisocyanate, naphthalene-1,5-diisocyanate, methylene bis(4-phenyl isocyanate) and 4,4'-biphenylene diisocyanate. Mixtures of tolylene-2,4- and 2,6-diisocyanate may also be used. The preferred diisocyanate is tolylene diisocyanate. In general, the diisocyanates having the isocyanate groups substituted on aromatic rings are preferred since they are more readily available commercially. However, instances may arise wherein the aliphatic diisocyanates may be more desirable, as when color stability is especially important.

It has now been determined that polar linkages contribute greatly to the oil resistance properties of urethane elastomers even though they have an adverse effect on the low temperature flexibility. A key factor in retaining the advantageous oil resistance property while decreasing the low temperature flexibility loss has been the arranging of the polar linkages and cross-links between long, flexible polyether chains, The isocyanate group of the organic polyisocyanate reacts with the hydroxyl group of the polyether polyol and with the amine group of the polyamine chain extender to produce urethane and urea groups, respectively. The urethane and urea linkages produced by this reaction are classified as polar linkages. Thus, in addition to controlling the amine/hydroxyl ratio discussed above, the isocyanate (—NCO) to amine plus (+) hydroxyl ratio is carefully maintained in the range of from about 0.9/1 to 1.5/1. An isocyanate (—NCO) to amine plus (+) hydroxyl ratio of from 1/1 to 1.2/1 is preferred. Table IV, presented below, demonstrates the effect which this ratio has an the physical properties of the elastomers of this invention.

In addition to the use of the tetrahydrofuran-ethylene oxide polyether urethane-urea polymers of this invention in the preparation of elastomers, foamed products may be prepared by techniques known in the art. Foaming can be accomplished by employing a small amount of water in the reaction mixture (for example, from about 0.5 to 5 weight percent of water, based upon total weight of the reaction mixture) or through the use of blowing agents, such as fluorocarbons, which are vaporized by the exotherm of the isocyanate-reactive hydrogen reaction, or by a combination of the two methods. All of these methods are well known in the art. It must be borne in mind, however, that polar linkages, urea linkages, are formed by the reaction of water with isocyanate groups. Therefore, the contribution of water to the polar structure of the polymers must be evaluated in calculating the amine to hydroxyl ratio and isocyanate (—NCO) to amine plus (+) hydroxyl ratio discussed above.

In preparing the urethane elastomers of this invention, a catalyst may be employed to accelerate the isocyanate-hydroxyl and isocyanate-amine reactions. Numerous catalysts may be used in this reaction. Metal carboxylate salts and tertiary amines are perhaps the catalysts employed most frequently. Examples of these catalysts include dibutyltin dilaurate, lead naphthenate, stannous octoate, bismuth octoate, trimethylpiperazine, 2,2-diazabicyclooctane, triethylamine, tetramethylethylenediamine, and tetramethylbutanediamine.

The novel tetrahydrofuran-ethylene oxide polyether urethane-urea elastomers of this invention may be prepared by either a prepolymer or a one-step procedure. When following the prepolymer technique, a prepolymer is prepared by reacting an organic polyisocyanate with the tetrahydrofuran-ethylene oxide polyether copolymer at temperatures of from about 20° C. to about 160° C. and for a period of up to about 24 hours, e.g., from about 5 minutes to 24 hours. It is preferred to carry out the reaction at a temperature of about 80° C. to about 100° C. and for about two to four hours. The actual time and temperature of the reaction will generally depend upon whether or not a catalyst is used and, if used, its concentration and activity. The prepolymer may be formed by adding the hydroxyl-containing component either totally or intermittently to the organic polyisocyanate or the organic polyisocyanate may be added either totally or intermittently to the hydroxyl-containing component. The prepolymer is then added to a reaction mixture of a catalyst, if used, and a polyamine chain extending agent or to a catalyst and a polyol-polyamine blend to produce the urethane-urea elastomers of this invention.

When following the one-step or "one-shot" reaction, the diisocyanate is added to a reaction mixture of tetrahydrofuran-ethylene oxide polyether copolymer, diamine and catalyst. The addition takes place preferably under anhydrous conditions, at room temperature, with good agitation, and while maintaining a vacuum of approximately three millimeters of mercury. Upon completion of the addition of diisocyanate to the reaction mixture, the vacuum is broken and the liquid casting elastomer is poured into molds and cured.

The urethane-urea elastomers of this invention are cured under conditions which will vary considerably, depending upon the activity of the diamine and catalyst, the temperature, time and the processing method. Of course, the more active the diamine and catalyst, the less time and temperature required to effect the cure. Generally, however, the cure will be effected at temperatures of about 0° C. to about 200° C., preferably about 60° C. to about 140° C., for a period up to about 24 hours, preferably about one to about five hours.

The elastomers of this invention may be cured in two steps. Initial curing may take place in a mold, whereas final curing or post-curing takes place after the elastomer is removed from the mold. If desired, pressure may be used in effecting the cure.

The following examples will serve to illustrate the invention. The properties of the elastomers were obtained using generally standard test methods. ASTM Designation D412 was used to evaluate stress-strain, tensile strength and ultimate elongation properties. The tensile testing machine was an Instron Model TPC-M-1.

The hardness of the ultimate composition was measured with a Shore Type A durometer. The method is according to ASTM Designation D676-59T. This test was run on one-half inch thick discs. The Compression Set, after 70 hours at 212° F., was measured according to ASTM Designation D395, Method B.

ASTM Designation D1053 was used for the determination of Young's modulus of elasticity. The percent weight and volume change of the elastomer in contact with ASTM No. 3 Oil, after 70 hours at 212° F., was determined in accordance with ASTM Designation D471. The percent water absorption, after 24 hours at 75° F., was measured according to ASTM Designation D570-57T, Procedure A, D. 24/33.

EXAMPLES 1–15

Several tetrahydrofuran-ethylene oxide polyether polyols were prepared by polymerizing, in the presence of a catalyst, various proportions of tetrahydrofuran and ethylene oxide with a diol, triol, tetrol, and the like, initiator. In this manner, dry tetrahydrofuran, ethylene oxide, ethylene or methylene dichloride solvent, initiator and $BF_3$ etherate catalyst were charged into a jacketed kettle and reacted for approximately twelve hours at a temperature of approximately 0° C. The reaction temperature was controlled by circulating cold methanol through the jacket and the reaction was halted by the addition of excess ammonium hydroxide. The solvent was evaporated off under three millimeters of mercury vacuum, the ammonium salts removed by filtration, and the tetrahydrofuran-ethylene oxide copolymer obtained. Table I illustrates various polyether polyols prepared.

TABLE I.—FORMULATIONS FOR THE PREPARATION OF TETRAHYDROFURAN-ETHYLENE OXIDE COPOLYMERS

| Reactants, Wt., G. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Ethylene Dichloride | 990 | 990 | 990 | 990 | 990 | 990 | 990 | 990 | | | | | | | |
| Methylene Chloride | | | | | | | | | 850 | 8,500 | 850 | 850 | 850 | 850 | 850 |
| Tetrahydrofuran | 360 | 540 | 540 | 810 | 810 | 540 | 540 | 540 | 1,512 | 8,740 | 720 | 720 | 720 | 720 | 720 |
| Ethylene Oxide | 220 | 330 | 330 | 495 | 495 | 440 | 495 | 550 | 308 | 4,392 | 436 | 440 | 440 | 440 | 440 |
| Boron Triflouride Etherate | 1.2 | 1.8 | 1.8 | 1.8 | 2.7 | 2.1 | 2.2 | 2.4 | 3.6 | 36.0 | 3.6 | 3.6 | 3.6 | 3.6 | 3.6 |
| 1,4-butanediol | 15 | 15 | | | | | | | | | | | | | |
| Trimethylolpropane | | | 22.4 | 22.4 | 22.4 | 23.4 | 23.4 | 23.4 | 33.5 | 335.0 | | | | | |
| Ethylene Glycol | | | | | | | | | | | 97.5 | 37.1 | | | |
| Glycerol | | | | | | | | | | | | | 27.3 | | |
| Pentaerythritol | | | | | | | | | | | | | | 20.0 | |
| Sorbitol | | | | | | | | | | | | | | | 14.25 |
| Molecular Wt. (by OH No.) | 2,400 | 3,500 | 4,400 | 3,900 | 5,900 | 4,600 | 3,800 | 4,100 | 4,305 | 4,371 | 530 | 1,588 | 3,010 | 28,000 | 23,400 |

EXAMPLES 16–19

Elastomers were prepared utilizing the tetrahydrofuran-ethylene oxide polyether polyols prepared above. Unless stated otherwise, the same general procedure was followed in preparing all of the elastomers. Basically, it involved fitting a reaction vessel with a stirrer, heat exchange means, thermometer and nitrogen means and adding to the vessel the polyether polyol and polyamine reactants. The polyol-polyamine blend was stripped of water by heating at about 120° C. for about two hours under about three millimeters of mercury vacuum. The essentially anhydrous blend was then cooled to about 60° C. and a catalytic amount of stannous octoate was added and the reaction mixture was degassed for about fifteen minutes under about three millimeters of mercury vacuum.

The vacuum of about three millimeters of mercury was maintained and the organic diisocyanate was added with constant stirring. Mixing was continued for about thirty seconds, the vacuum was broken, and the resulting urethane-urea elastomers were poured into molds and cured for about sixteen hours at 100° C. The elastomers were then removed from the molds and their properties tested. Table II shows various urethane-urea elastomers prepared from the tetrahydrofuran-ethylene oxide polyether polyols in accordance with the subject invention.

TABLE II.—ELASTOMER CONTAINING TETRAHYDROFURAN-ETHYLENE OXIDE COPOLYMERS, DICHLOROBENZIDINE AND TOLUENE DIISOCYANATE

|  | Control | 16 | 17 | 18 | 19 |
|---|---|---|---|---|---|
| Polytetramethylene Ether Glycol | Diol* | | | | |
| Tetrahydrofuran-Ethylene Oxide Polyether Polyol | | Diol [1] | Diol [1] | Triol [2] | Triol.[2] |
| Molecular Weight of Polyether Polyol | 2,900 | 2,400 | 3,500 | 4,400 | 3,900. |
| Diisocyanate, Percent | 11.2 TDI [3] | 12.0 TDI [3] | 10.3 TDI [3] | 11.0 TDI [3] | 11.6 TDI.[3] |
| Diamine, Percent | 7.2 DCB [4] | 7.2 DCB [4] | 7.2 DCB [4] | 7.2 DCB [4] | 7.2 DCB.[4] |
| NCO/(Amine+OH) Ratio | 1.1 | 1.1 | 1.1 | 1.1 | 1.1. |
| Properties: | | | | | |
| Tensile Strength, p.s.i. | 2,840 | 290 | 380 | 770 | 850. |
| Elongation, Percent | 580 | 160 | 480 | 160 | 170. |
| Modulus, 100%, p.s.i. | 720 | 210 | 440 | 640 | 590. |
| Modulus, 300%, p.s.i. | 1,460 | | 590 | | |
| Hardness, Shore A | 85 | 62 | 73 | 81 | 79. |
| Compression Set, 70 hrs. at 212° F | 70 | 98 | 74 | 46 | 44. |
| ASTM No. 3 Oil, 70 hrs. at 212° F.: | | | | | |
| Wt. Change, Percent | 38 | 10 | 12 | 12 | 9. |
| Vol. Change, Percent | 42 | 11 | 15 | 10 | 11. |
| Percent Water Absorption, 24 hrs. at 75° F | 1.3 | 2.6 | 0.7 | 2.4 | −0.7. |
| Young's Modulus, E: | | | | | |
| −55° C | 63,000 | 8,100 | 6,400 | 6,800 | 6,500. |
| −50° C | 51,000 | 7,300 | 5,400 | 6,100 | 5,200. |
| −45° C | 39,000 | 6,600 | 6,500 | 6,000 | 4,700. |

[1] 1,4-butane diol.  [2] Trimethylolpropane.  [3] Toluene diisocyanate.  [4] Dichlorobenzidine.  *Polytetramethylene ether glycol control.

Table II above gives a comparison of the properties of a prior art elastomer, prepared from a polytetramethylene ether diol, with those properties of the urethane-urea elastomers of this invention. An excellent and unexpected improvement in low temperature modulus and oil absorption values is shown.

EXAMPLES 20–22

Elastomers were prepared, in the manner described above, wherein polytetramethylene glycol alone, polytetramethylene glycol and tetrahydrofuran-ethylene oxide polyether triol, and tetrahydrofuran-ethylene oxide polyether triol alone were substituted for the polyether triol in a standard elastomer formulation. These elastomers are shown in Table III.

TABLE III.—EFFECT OF TETRAHYDROFURAN-ETHYLENE OXIDE POLYETHERS SUBSTITUTED FOR THE 14,000 MOLECULAR WEIGHT POLYETHER IN STANDARD FORMULATION

| Polyol Blend | 20 | 21 | 22 |
|---|---|---|---|
| 3,900 M.W. Triol,[1] Tetrahydrofuran-Ethylene Oxide Polyether Polyol, Percent | | 52 | 82 |
| 2,900 M.W. Polytetramethylene Glycol, Percent | 32 | 32 | |
| 14,000 M.W. Triol, Percent | 52 | | |
| Trimethylolpropane, Percent | 0.5 | | |
| DCB,[2] Percent | 5.7 | 5.6 | 7.2 |
| TDI,[3] Percent | 9.0 | 10.4 | 11.6 |
| Tensile Strength, p.s.i. | 1,120 | 940 | 850 |
| Elongation, Percent | 420 | 300 | 170 |
| Modulus, 100%, p.s.i. | 450 | 440 | 590 |
| Modulus, 300%, p.s.i. | 790 | 940 | |
| Hardness, Shore A | 68 | 78 | 79 |
| Compression Set, 70 hrs. at 212° F | 55 | 53 | 44 |
| ASTM No. 3 Oil, 70 hrs. at 212° F.: | | | |
| Wt. Change, percent | 50 | 25 | 9 |
| Vol. Change, percent | 56 | 29 | 11 |
| Percent Water Absorption, 24 hrs. at 75° F | 2.0 | −1.1 | −0.7 |
| Young's Modulus, E: | | | |
| −55° C | 6,100 | 10,000 | 6,500 |
| −50° C | 5,000 | 6,500 | 5,200 |
| −45° C | 3,100 | 4,600 | 4,700 |

[1] Trimethylolpropane initiator.
[2] Dichlorobenzidine.
[3] Toluene diisocyanate.

In Example 20, Table III above illustrates that polytetramethylene glycol (polytetrahydrofuran) blended in the standard formulation yields an elastomer product with comparatively poor oil absorption resistance. Example 22 shows that when the sole polyol ingredient is a tetrahydrofuran-ethylene oxide triol of the same approximate polyol equivalent weight, an excellent and surprising enhancement of the oil absorption resistance occurs. Example 21 illustrates that when polytetramethylene glycol and tetrahydrofuran-ethylene oxide polyether polyol are blended together in the standard formulation, to the same approximate polytetramethylene glycol content as Example 20, only a compromise lowering in the oil absorption property of the elastomer product is produced. Thus, Examples 20 and 21 show that an elastomer formulation containing polytetramethylene glycol alone and a polytetramethylene glycol and tetrahydrofuranethylene oxide polyether triol blend do not produce elastomers with satisfactory oil absorption resistance. However, Example 22 demonstrates that when tetrahydrofuran is copolymerized with ethylene oxide such that the polytetramethylene radicals are incorporated into the polyether copolymer chain, an elastomer can be produced therefrom which has excellent low oil absorption characteristics.

EXAMPLES 23–27

Elastomers were prepared in the manner described above in which the isocyanate (—NCO) to amine plus (+) hydroxyl ratio was varied, while the other conditions and reactants were substantially maintained as constants. These elastomers are shown in Table IV.

TABLE IV.—EFFECT OF VARYING THE ISOCYANATE (NCO) TO AMINE (NH₂) PLUS HYDROXYL (OH) RATIO OF TETRAHYDROFURAN-ETHYLENE OXIDE COPOLYMER ELASTOMERS

| Example | 23 | 24 | 25 | 26 | 27 |
|---|---|---|---|---|---|
| Tetrahydrofuran-ethylene oxide polyether polyol,[a] molecular weight | 4,371 | 4,371 | 3,900 | 4,371 | 4,371 |
| NCO [b]/(NH₂ +OH) | 0.7/1 | 0.9/1 | 1.1/1 | 1.3/1 | 1.7/1 |
| Tensile Strength | ([d]) | 594 | 850 | 957 | 1,077 |
| Modulus, 100%, p.s.i. | ([d]) | 555 | 590 | 782 | 879 |
| Elongation, percent | ([d]) | 130 | 170 | 147 | 150 |
| Hardness, Shore A | ([d]) | 83 | 79 | 91 | 90 |
| ASTM No. 3 Oil: | | | | | |
| Wt. Change, percent | ([d]) | 13 | 9 | 11.2 | 14.0 |
| Vol. Change, percent | ([d]) | 14 | 11 | 12.9 | 11.5 |
| Young's Modulus, E: | | | | | |
| −55° C | ([d]) | 7,500 | 6,500 | 14,000 | ([e]) |
| −50° C | ([d]) | 5,100 | 5,200 | 11,000 | ([e]) |
| −45° C | ([d]) | 4,000 | 4,700 | 9,500 | ([e]) |

[a] Triol with trimethylolpropane initiator.
[b] Toluene diisocyanate.
[c] Dichlorobenzidine.
[d] Elastomer produced of very poor quality and not tested.
[e] Modulus outside desired range.

As seen from Table IV above, urethane-urea elastomers produced wherein the isocyanate (—NCO) to amine plus (+) hydroxyl (—OH) ratio is lower than 0.9/1 are poor products. At a ratio higher than about 1.5/1 the low temperature flexibility properties of the elastomers are adversely affected and the Young's Modulus values are outside the desired range.

EXAMPLES 28–33

Various urethane-urea elastomers of this invention were prepared, in the manner described above, in which the ethylene oxide content of the tetrahydrofuran-ethylene oxide copolymer was varied, while the other conditions and reactants were maintained substantially as constants. These elastomers are shown in Table V.

TABLE V.—EFFECT OF INCREASING ETHYLENE OXIDE CONTENT ON PROPERTIES OF TETRAHYDROFURAN-ETHYLENE OXIDE COPOLYMER ELASTOMERS

| | Control | 28 | 29 | 30 | 31 | 32 | 33 |
|---|---|---|---|---|---|---|---|
| Tetrahydrofuran-ethylene oxide polyether polyol,[a] molecular weight | (b) | 4,305 | 4,371 | 4,350 | 4,500 | 3,900 | 4,200 |
| Wt. percent ethylene oxide in triol reactants | 0 | 25.2 | 38.9 | 48.1 | 55.5 | 58.4 | 61 |
| Tensile Strength, p.s.i | 2,840 | 849 | 594 | 770 | 570 | 650 | 690 |
| Elongation, percent | 580 | 134 | 130 | 160 | 160 | 110 | 280 |
| Modulus, 100%, p.s.i | 720 | 733 | 555 | 640 | 400 | 590 | 370 |
| Hardness, Shore A | 85 | 89 | 83 | 81 | 72 | 77 | 66 |
| Compression Set, 70 hrs. at 212° F | 70 | | | 46 | 53 | 53 | |
| ASTM No. 3 Oil, 70 hrs. at 212° F.: | | | | | | | |
| Wt. Change, percent | 38 | 14 | 13 | 10 | 10 | 10 | 9 |
| Vol. Change, percent | 42 | 15 | 14 | 12 | 13 | 12 | 11 |
| Percent Water Absorption, 24 hrs. at 75° F | 1.3 | | | 2.4 | 4.5 | 5.6 | 10.6 |
| Young's Modulus, E: | | | | | | | |
| −55° C | 63,000 | 7,300 | 7,500 | 6,800 | 3,200 | 5,300 | |
| −50° C | 51,000 | 6,400 | 5,100 | 6,100 | 2,800 | 5,900 | |
| −45° C | 39,000 | 5,300 | 4,000 | 6,000 | 1,700 | 4,000 | |

[a] Triol from trimethylolpropane initiator.
[b] Control of polytetramethylene glycol, molecular weight 2,860.

As seen from Table V above, the desired low oil absorption values of the urethane-urea elastomers of this invention are enhanced by the utilization of a tetrahydrofuran-ethylene oxide copolymer. The minimum ethylene oxide content required to effect the desired oil absorption value is thus about 20% by weight of the tetrahydrofuran-ethylene oxide copolymer. Table V also illustrates that the undesirable water absorption property of the urethane-urea elastomers increases with the ethylene oxide content of the copolymer. Thus, the maximum ethylene oxide content which may be present in the tetrahydrofuran-ethylene oxide copolymer is about 60% by weight of the copolymer. Therefore, a urethane-urea elastomer is produced possessing both oil absorption resistance and low water absorption properties, by incorporating into the polymer structure a tetrahydrofuran-ethylene oxide copolymer having an ethylene oxide content of from about 20% to about 60% by weight of the copolymer.

Although this invention is primarily concerned with the preparation of urethane-urea elastomers, it is also within the scope of the invention to use the tetrahydrofuran-ethylene oxide polyether urethane-urea polymers in the preparation of coatings, sealants, foams, and the like.

What is claimed is:
1. A polyether urethane-urea polymer comprising the reaction product of:
  (a) a heteric polyether polyol obtained by the reaction of a mixture of ethylene oxide and tetrahydrofuran with a hydroxyl containing compound having a functionality of at least two, said polyol having a molecular weight of from about 400 to 16,000 and containing from about 20% to about 60% by weight ethylene oxide,
  (b) an organic polyisocyanate, and
  (c) a polyamine selected from the group consisting of primary and secondary polyamines and mixtures thereof, the polymer having an amine to hydroxyl ratio of from about 0.25/1 to 6.0/1 and an isocyanate to amine plus hydroxyl ratio of from about 0.9/1 to 1.5/1.
2. The polyether urethane-urea polymer of claim 1 wherein said polyol has an ethylene oxide content of from about 30% to 50% by weight of said polyol.
3. The polyether urethane-urea polymer of claim 1 wherein said polyol has a molecular weight of from about 2500 to 7000.
4. The polyether urethane-urea polymer of claim 1 wherein said organic polyisocyanate is toluene diisocyanate.
5. The polyether urethane-urea polymer of claim 1 wherin said polyamine is dichlorobenzidine.
6. The polyether urethane-urea polymer of claim 1 wherein said polymer has an amine to hydroxyl ratio of from about 0.5/1 to 2.0/1.
7. The polyether urethane-urea polymer of claim 1 wherein said polymer has an isocyanate to amine plus hydroxyl ratio of from about 1/1 to 1.2/1.
8. The process of preparing a polyether urethane-urea elastomer which comprises
  (1) preparing a polymer by reacting:
  (a) a heteric polyether polyol obtained by the reaction of a mixture of ethylene oxide and tetrahydrofuran with a hydroxyl containing compound having a functionality of at least two, said polyol having a molecular weight of from about 400 to 16,000 and containing from about 20% to 60% by weight ethylene oxide,
  (b) an organic polyisocyanate, and
  (c) a polyamine selected from the group consisting of primary and secondary polyamines and mixtures thereof, the polymer having an amine to hydroxyl ratio of from about 0.25/1 to 6.0/1 and an isocyanate —NCO to amine plus hydroxyl ratio of from about 0.9/1 to 1.5/1, and
  (2) curing said polymer by heating at a temperature of from about 0° C. to about 160° C.
9. The process of claim 8 wherein said polyol has an ethylene oxide content of from about 30% to 50% by weight of said copolymer.
10. The process of claim 8 wherein said polyol has a molecular weight of from about 2500 to 7000.
11. The process of claim 8 wherein said organic polyisocyanate is toluene diisocyanate.
12. The process of claim 8 wherein said polyamine is dichlorobenzidine.
13. The process of claim 8 wherein said polymer has an amine to hydroxyl ratio of from about 0.5/1 to 2.0/1.
14. The process of claim 8 wherein said polymer has an isocyanate to amine plus hydroxyl ratio of from about 1/1 to 1.2/1.

References Cited

UNITED STATES PATENTS

| 2,929,800 | 3/1960 | Hill | 260—77.5 |
| 3,061,559 | 10/1962 | Henson et al. | 260—2.5 |
| 3,169,934 | 2/1965 | Dennett et al. | 260—2.5 |
| 3,194,793 | 7/1965 | Kogon | 260—77.5 |
| 3,203,932 | 8/1965 | Frisch et al. | 260—77.5 |
| 3,222,300 | 12/1965 | Loew | 260—2.5 |
| 3,294,724 | 12/1966 | Axelrood | 260—29.2 |

OTHER REFERENCES

Hackh's Chemical Dictionary, Third Ed., p. 151 relied upon (1944), call number QD 5.H3.

DONALD E. CZAJA, *Primary Examiner.*

M. J. WELSH, *Assistant Examiner.*

U.S. Cl. X.R.

260—615, 2.5; 117—161